(12) United States Patent
Oluwa et al.

(10) Patent No.: US 12,020,192 B2
(45) Date of Patent: Jun. 25, 2024

(54) ESTIMATING WELL DOWNTIME FACTOR IN FIELD MODELING

(71) Applicant: SAUDI ARABIAN OIL COMPANY, Dhahran (SA)

(72) Inventors: Jubril Oluwa, Dhahran (SA); Ali Essa Al-Mahfoudh, Qatif (SA); Hashim Shaikh Sulaiman, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 33 days.

(21) Appl. No.: 17/484,659

(22) Filed: Sep. 24, 2021

(65) Prior Publication Data

US 2023/0102461 A1     Mar. 30, 2023

(51) Int. Cl.
G06Q 10/0635     (2023.01)

(52) U.S. Cl.
CPC .................. *G06Q 10/0635* (2013.01)

(58) Field of Classification Search
CPC .................................... G06Q 10/0635
USPC ........................................ 705/7.28
See application file for complete search history.

(56) References Cited

U.S. PATENT DOCUMENTS

| | | | | |
|---|---|---|---|---|
| 5,064,348 A * | 11/1991 | McKee | ................. | F04B 49/065 417/18 |
| 5,871,047 A * | 2/1999 | Spath | ...................... | E21B 47/00 166/250.01 |
| 6,662,109 B2 * | 12/2003 | Roggero | ................ | G01V 11/00 702/6 |
| 6,662,146 B1 * | 12/2003 | Watts | ...................... | E21B 49/00 703/2 |
| 2006/0136085 A1 * | 6/2006 | Steinhilper | ....... | G05B 19/41865 29/430 |
| 2010/0299125 A1 * | 11/2010 | Ding | ...................... | E21B 43/12 703/10 |
| 2017/0153358 A1 * | 6/2017 | Hansen | ................... | G01V 9/005 |
| 2018/0347326 A1 * | 12/2018 | Shammari | ............. | E21B 49/087 |
| 2019/0094403 A1 * | 3/2019 | Prochnow | ............... | G01V 1/50 |
| 2021/0003741 A1 * | 1/2021 | Oluwa | ..................... | G06F 30/20 |
| 2021/0081823 A1 * | 3/2021 | Boguslawski | ........ | E21B 47/009 |

(Continued)

FOREIGN PATENT DOCUMENTS

WO       2018/005214 A1       1/2018
WO    WO-2018005214 A1 *    1/2018    ........... G01V 99/005

OTHER PUBLICATIONS

Mr. Tatiya Wirawit, "Computer Program Development for Productivity Index Prediction Usingmultiple Linear Regression Method of Mae-Soon Oil Field, Fang Basin" Geo technology Suranaree University of Technology. (Year: 2013).*

*Primary Examiner* — Abdallah A El-Hage Hassan
(74) *Attorney, Agent, or Firm* — Osha Bergman Watanabe & Burton LLP (57) ABSTRACT

A method includes obtaining, using a computer processor, reservoir data and downtime factors for a well, determining, using the computer processor, an absolute potential flow rate for the well using the reservoir data, uniformly reducing, using the computer processor, an initial productivity index of the well to create a reduced productivity index having a productivity index multiplier, determining, using the computer processor, a relationship between the productivity index multiplier and each downtime factor for the well, and predicting production losses, using the relationship and the computer processor, of a field of wells as a result of the downtime factors.

9 Claims, 5 Drawing Sheets

(56) References Cited

U.S. PATENT DOCUMENTS

| | | | |
|---|---|---|---|
| 2021/0222552 A1* | 7/2021 | Gao | E21B 49/02 |
| 2022/0137609 A1* | 5/2022 | Tsutsumi | G06Q 50/04 |
| | | | 700/96 |

* cited by examiner

ESTIMATING WELL DOWNTIME FACTOR IN FIELD MODELING

BACKGROUND

In the petroleum industry, hydrocarbons are located in reservoirs far beneath the Earth's surface. Wells are drilled into these reservoirs to access and produce the hydrocarbons. Wells are structures that include casing strings, cement, and various production equipment. Wells may last anywhere from ten to one hundred years; as such, wells experience downtime throughout their life due to well maintenance, well surveillance, or failure of equipment. Well downtime creates a loss of production which, in turn, effects the well's productivity index.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a method and a non-transitory computer readable medium. The method includes obtaining, using a computer processor, reservoir data and downtime factors for a well, determining, using the computer processor, an absolute potential flow rate for the well using the reservoir data, uniformly reducing, using the computer processor, an initial productivity index of the well to create a reduced productivity index having a productivity index multiplier, determining, using the computer processor, a relationship between the productivity index multiplier and each downtime factor for the well, and predicting production losses, using the relationship and the computer processor, of a field of wells as a result of the downtime factors.

The non-transitory computer readable medium stores instructions for predicting a productivity index for a downtime factor, the instructions include functionality for obtaining, using a computer processor, reservoir data and downtime factors for a well, determining, using the computer processor, an absolute potential flow rate for the well using the reservoir data, uniformly reducing, using the computer processor, an initial productivity index of the well to create a reduced productivity index having a productivity index multiplier, determining, using the computer processor, a relationship between the productivity index multiplier and each downtime factor for the well, and predicting production losses, using the relationship and the computer processor, of a field of wells as a result of the downtime factors.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein disclose an approach to predict well production performance at varying well downtime percentages through development of a relationship between well downtime factors and well productivity indexes. More specifically, embodiments disclosed herein relate to an application and method to predict production losses of a gas field due to infrequent shut-in of wells for maintenance, surveillance and operational issues. In one or more embodiments, this is achieved this by establishing a non-linear relationship between well productivity index (PI) and well downtime at varying well rates, from absolute well potential to a minimum or abandon well rate.

Figure 1:
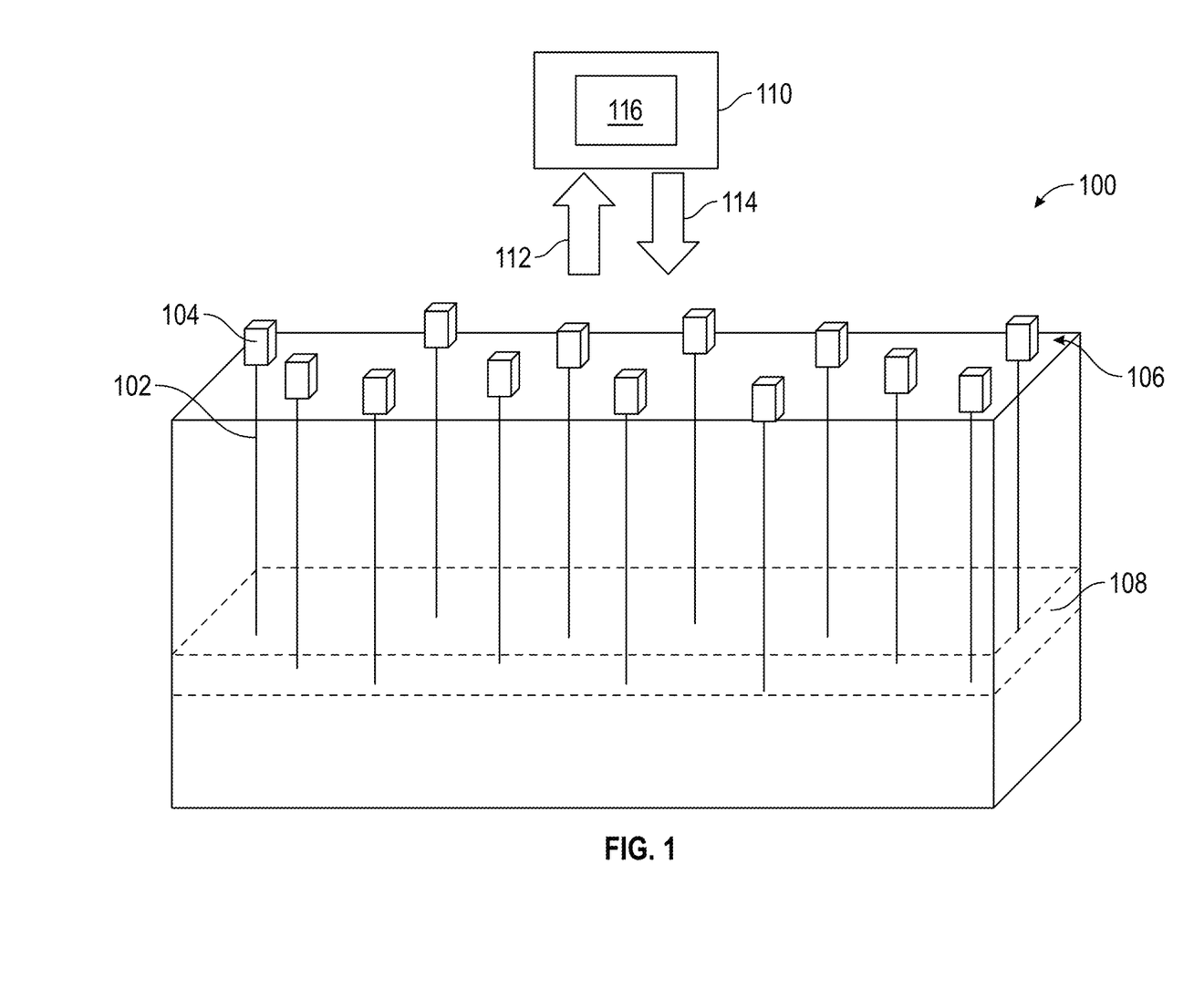
FIG. 1 shows an exemplary field in accordance with one or more embodiments.

FIG. 1 depicts an exemplary field (100) in accordance with one or more embodiments. A field (100) is a geographical region or location that includes a plurality of wells (102). The field (100) may include the wells' surface equipment, such as production trees (104), and other production equipment such as pipelines, tanks, separators, etc. Each well (102) extends from a surface location (106) into a reservoir (108). Typically, the field (100) is delineated by the wells (102) that are near to each other geographically and drilled into the same reservoir (108).

The reservoir (108) is a formation containing fluids intended to be produced such as oil, gas, and/or water. The wells (102) shown in FIG. 1 are vertical conventional wells; however, those skilled in the art will appreciate that the wells in the field (100) may have any wellbore trajectory, such as horizontal, without departing from the scope of this disclosure herein. FIG. 1 shows the field (100) having 13 wells (102) each with a production tree (104). However, the field (100) may have any number of wells (102) without departing from the scope of this disclosure herein.

In further embodiments, the wells (102) are gas wells (102) making the field (100) a gas field (100). A computer system (110) on the surface (106) is connected to the field (100) by any means known in the art such as wirelessly or wired. The computer system (110) may receive a plurality of inputs (112) from each well (102) in the field (100) and may produce a plurality of outputs (114) using a computer processor (116). The computer system (110) and the computer processor (116) are further explained below in FIG. 6.

The inputs (112) may include any type of data gathered from the wells (102) or any data known about the well (102) of the reservoir (108) such as flow rate, fluid composition, equipment data, reservoir data, downtime factors, etc. The outputs (114) may include absolute potential, productivity indexes, optimum downtime factors, etc. In a field (100) such as the one depicted in FIG. 1, each well (102) encounters downtime factors throughout the life of the well (102).

Downtime factors may be caused by shut in well maintenance, well surveillance, and operational performance issues. As downtime factors are to be expected, it is beneficial to be able to predict production losses of a field (100) due to the downtime factors. As such, embodiments disclosed herein present systems and methods that may be used to predict production losses of a field (100) by establishing a relationship between each well's (102) productivity index and the various downtime factors.

Figure 2:
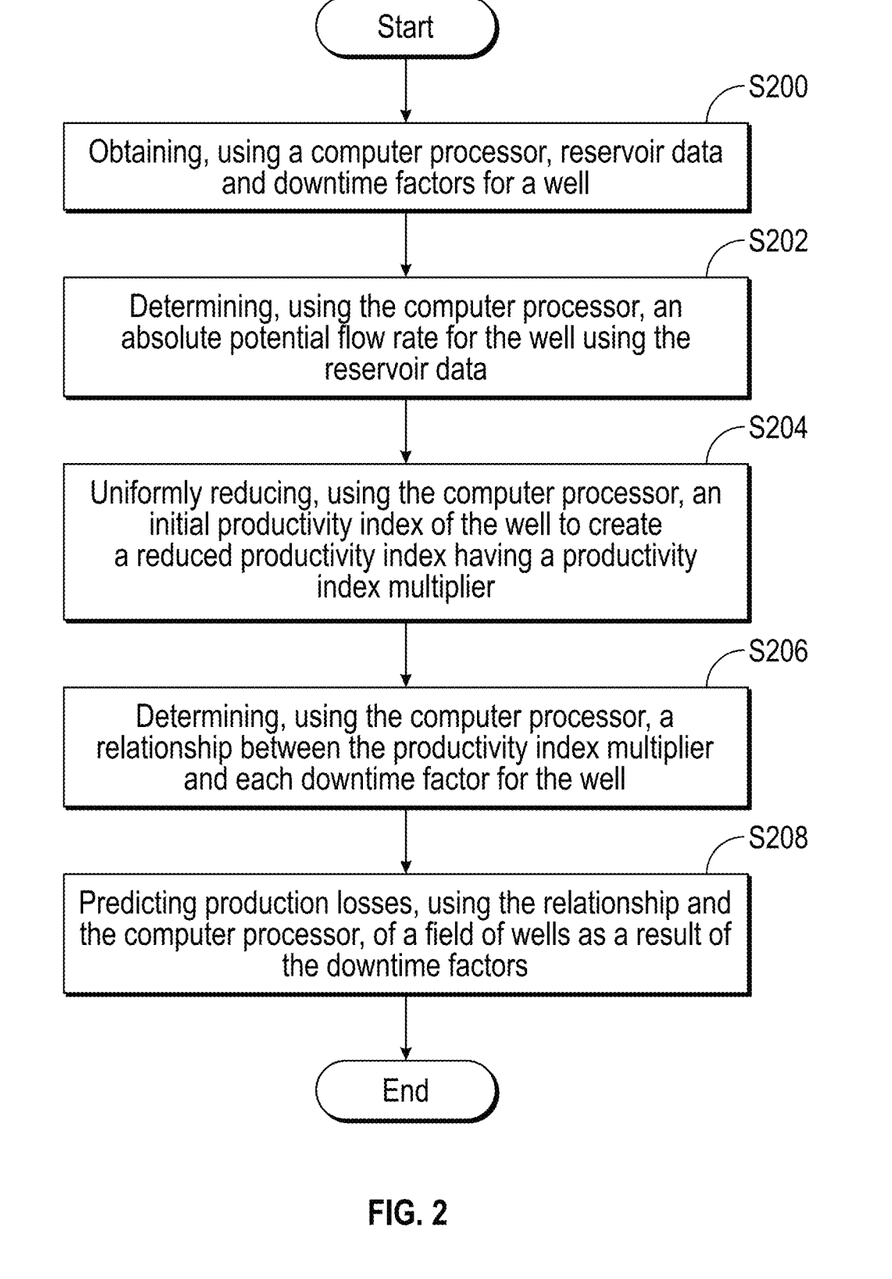
FIG. 2 shows a flowchart in accordance with one or more embodiments.

FIG. 2 depicts a flowchart in accordance with one or more embodiments. Specifically, FIG. 2 illustrates a method for predicting production losses of a field (100) of wells (102). The method outlined in FIG. 2 may be stored on a non-transitory computer readable medium. Further, one or more blocks in FIG. 2 may be performed by one or more components as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, reservoir (108) data and downtime factors are obtained for a well (102) using a computer processor (116) (S200). The reservoir (108) data and the downtime factors may be the inputs (112) as described above in FIG. 1. The reservoir (108) data is data for the reservoir (108) that the well (102) is drilled into. The reservoir (108) data may include data such as porosity, permeability, fluid make up, area of the reservoir (108), height of pay zone, formation volume factor, etc. As explained above, the downtime factors may be selected from a list including: shut-in well maintenance, well surveillance, and operational performance.

Figure 3:
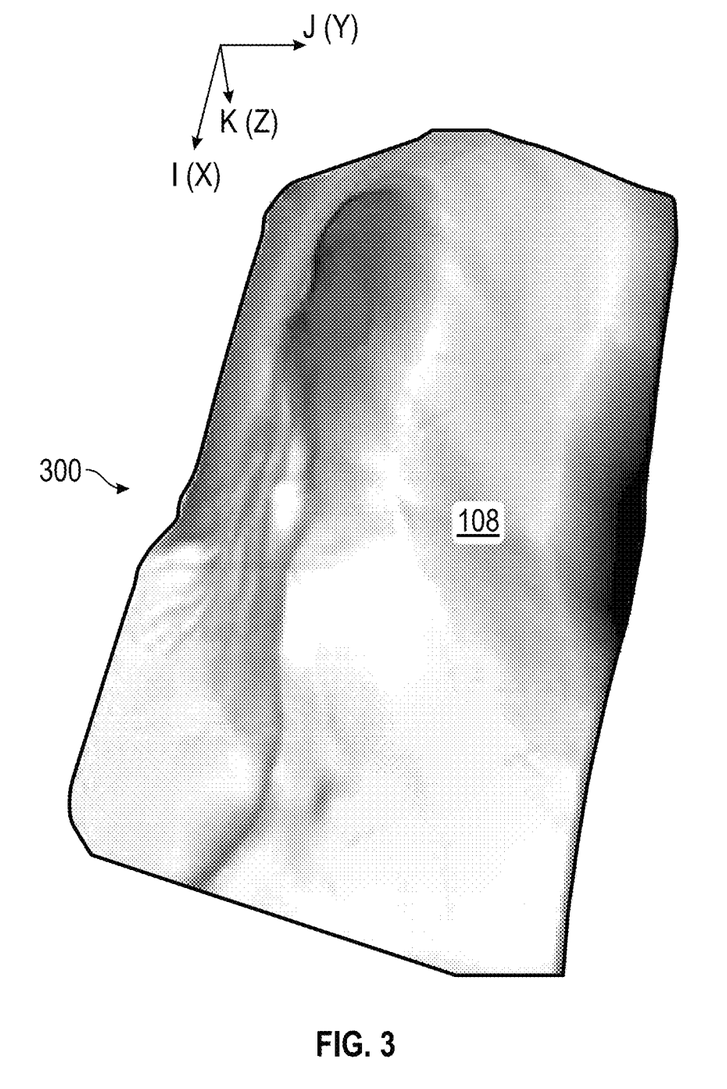
FIG. 3 shows a model of a reservoir in accordance with one or more embodiments.

An absolute potential flow rate for the well (102) is determined using the reservoir data and the computer processor (116) (S202). The absolute potential flow rate may be determined by using a commercially available program, such as Petrel, powered by the computer processor (116). FIG. 3 shows an example of a reservoir (108) model (300) developed using the computer processor (116) and the program. The model (300) shown in FIG. 3 depicts the production potential of the entire reservoir (108) using data from a plurality of wells (102). The absolute potential flow rate of a well (102) is how much fluid the well (102) could produce assuming there are no field (100) or well (102) constraints such as formation damage, volume constraints, pressure constraints, etc.

An initial productivity index is uniformly reduced to create a reduced productivity index having a productivity index multiplier using the computer processor (116) (S204). The initial productivity index may be reduced by running several reduction simulations on the commercially available program. A productivity index is a measurement of the ability of a well (102) to produce hydrocarbons at a commercial rate and represents the performance of a well (102). The initial productivity index may be set equal to the absolute potential flow rate for the well (102). The initial productivity index may be uniformly reduced by the productivity index multiplier to the productivity index at the "abandon well (102)" flow rate to create a plurality of reduced productivity indexes. The "abandon well" flow rate is determined based off of economic factors, i.e., when the well (102) would no longer be profitable.

Figure 4:
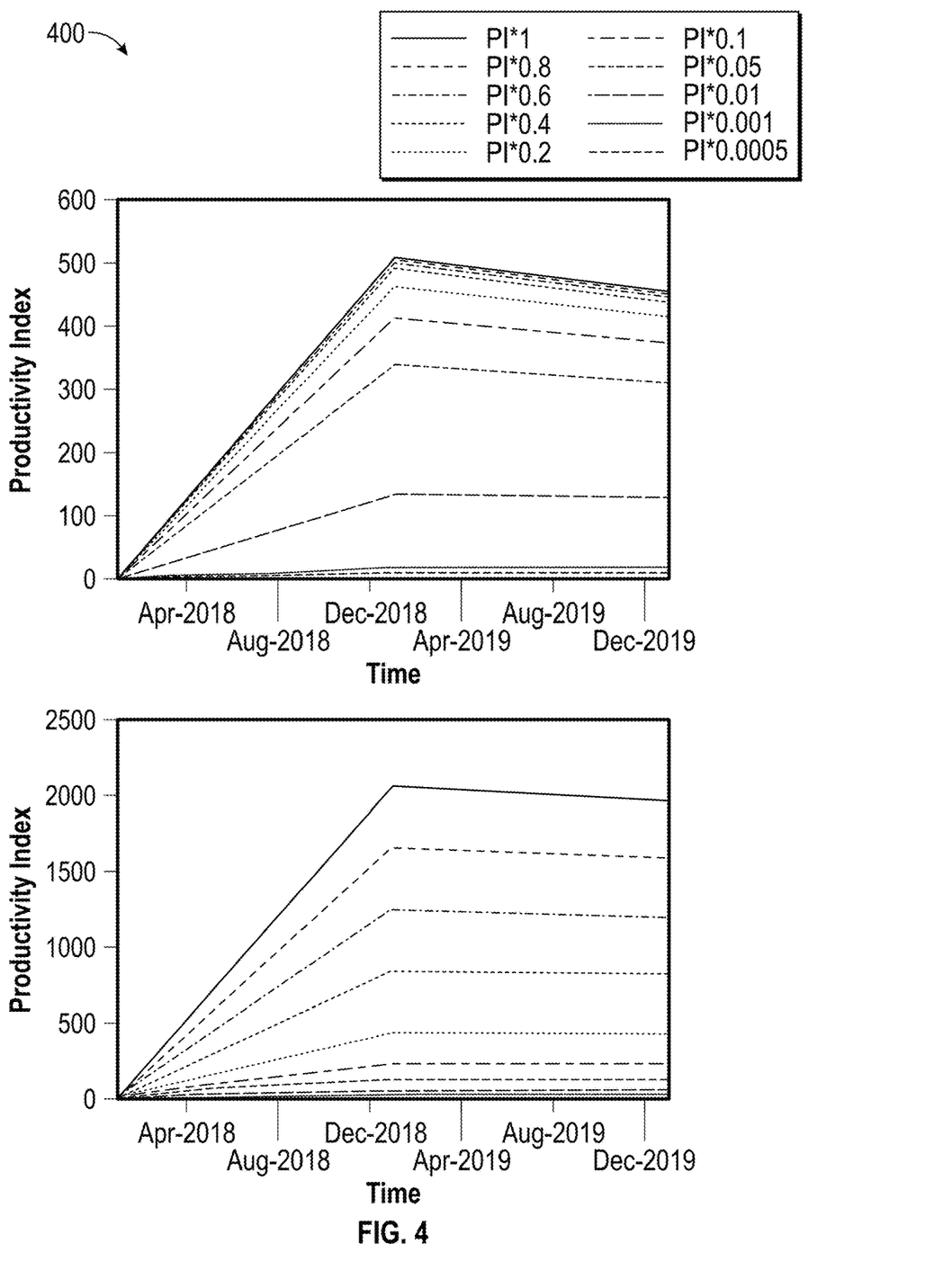
FIG. 4 shows a graph of productivity index over time in accordance with one or more embodiments.

FIG. 4 shows a graph of lines (400) where each line (400) represents a different reduced productivity index starting from the initial productivity index to the productivity index for the "abandon well (102)" flow rate. The y-axis shows the productivity index of a gas field (100) in Mscf/day. The x-axis represents time. Each line (400) shown on the graph in FIG. 4 shows the productivity index over time. These lines (400) (i.e., the reduced productivity indexes) are created by multiplying the initial productivity index (i.e., the absolute potential flow rate for the well (102)) by the productivity index multiplier which may range from 1 to 0.0005 (1 being absolute potential flow rate and 0.0005 being the abandon well (102) flow rate).

Figure 5:
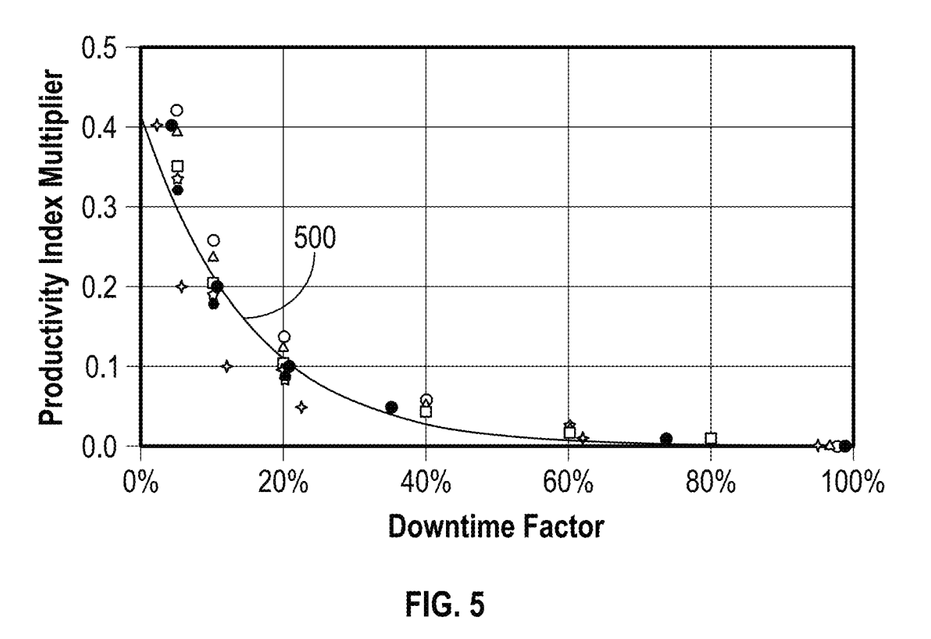
FIG. 5 shows a relationship between a production index multiplier and a well downtime factor in accordance with one or more embodiments.

A relationship (500) between the productivity index multiplier and each downtime factor for the well (102) is determined using the computer processor (116) (S206). FIG. 5 shows a graph, created by the computer processor (116), having the productivity index multipliers on the y-axis and a downtime factor percentage on the x-axis. The downtime factor percentages represent the ratio of the variable well production rate at the different downtime factors to the absolute potential flow rate. This graph shows the relationship (500) between the downtime factors and the productivity index multipliers, i.e., what the absolute well (102) potential flow rate should be multiplied by to get the estimated production rate for each downtime factor. Therefore, the relationship (500) between the productivity index multiplier and each downtime factor for the well (102) represents potential production losses for that well (102).

The relationship (500) between the reduced productivity index and downtime factor for the well (102) may be created using a dynamic simulation model (300) as the model (300) shown in FIG. 3. The relationship (500) between the reduced productivity index and each downtime factor for the well (102) may be a non-linear relationship (500) as shown in FIG. 5. More specifically, FIG. 5 shows that the relationship (500) between the reduced productivity index and each downtime factor may be an exponential relationship (500) represented by Equation (1) below where A and B are constants:

$$\text{Productivity Index Multiplier} = A * e^{WellDowntimeFactor * B} \quad \text{Equation (1)}$$

Further, production losses of a field (100) of wells (102), as a result of the downtime factors, are predicted using the relationship (500) and the computer processor (116) (S208). The production losses of a field (100) of wells (102) may be calculated by summing the production losses for each well (102) where the production losses for each well (102) were calculated using the relationship (500) between the productivity index multiplier and the downtime factors. Further, the relationship (500) can be used to determine an optimum downtime factor that should be used for each well (102) when predicting production losses.

Figure 6:
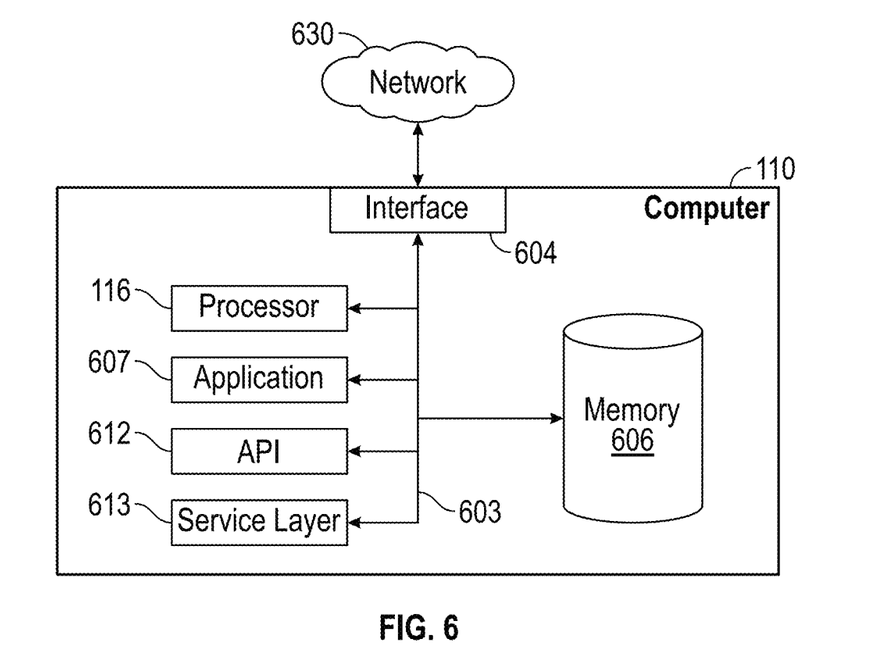
FIG. 6 shows a computer system in accordance with one or more embodiments.

FIG. 6 is a block diagram of a computer (110) used to provide computational functionalities associated with described algorithms, methods, functions, processes, flows, and procedures as described in the instant disclosure, according to an implementation. The illustrated computer (110) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (110) may include a computer that includes an input device, such as a keypad, keyboard, touch screen, or other device that can accept user information, and an output device that conveys information associated with the operation of the computer (110), including digital data, visual, or audio information (or a combination of information), or a GUI.

The computer (110) can serve in a role as a client, network component, a server, a database or other persistency, or any other component (or a combination of roles) of a computer for performing the subject matter described in the instant disclosure. The illustrated computer (110) is communicably coupled with a network (630). In some implementations, one or more components of the computer (110) may be configured to operate within environments, including cloud-computing-based, local, global, or other environment (or a combination of environments).

At a high level, the computer (110) is an electronic computing device operable to receive, transmit, process, store, or manage data and information associated with the described subject matter. According to some implementations, the computer (110) may also include or be communicably coupled with an application server, e-mail server, web server, caching server, streaming data server, business intelligence (BI) server, or other server (or a combination of servers).

The computer (110) can receive requests over network (630) from a client application (for example, executing on another computer (110)) and responding to the received requests by processing the said requests in an appropriate software application. In addition, requests may also be sent to the computer (110) from internal users (for example, from a command console or by other appropriate access method), external or third-parties, other automated applications, as well as any other appropriate entities, individuals, systems, or computers.

Each of the components of the computer (110) can communicate using a system bus (603). In some implementations, any or all of the components of the computer (110), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (110) or other components (whether or not illustrated) that are communicably coupled to the computer (110).

The functionality of the computer (110) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (110), alternative implementations may illustrate the API (612) or the service layer (613) as stand-alone components in relation to other components of the computer (110) or other components (whether or not illustrated) that are communicably coupled to the computer (110). Moreover, any or all parts of the API (612) or the service layer (613) may be implemented as child or sub-modules of another software module, enterprise application, or hardware module without departing from the scope of this disclosure.

The computer (110) includes an interface (604). Although illustrated as a single interface (604) in FIG. 6, two or more interfaces (604) may be used according to particular needs, desires, or particular implementations of the computer (110). The interface (604) is used by the computer (110) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (110).

The computer (110) includes at least one computer processor (116). Although illustrated as a single computer processor (116) in FIG. 6, two or more processors may be used according to particular needs, desires, or particular implementations of the computer (110). Generally, the computer processor (116) executes instructions and manipulates data to perform the operations of the computer (110) and any algorithms, methods, functions, processes, flows, and procedures as described in the instant disclosure.

The computer (110) also includes a memory (606) that holds data for the computer (110) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (110) and the described functionality. While memory (606) is illustrated as an integral component of the computer (110), in alternative implementations, memory (606) can be external to the computer (110).

The application (607) is an algorithmic software engine providing functionality according to particular needs, desires, or particular implementations of the computer (110), particularly with respect to functionality described in this disclosure. For example, application (607) can serve as one or more components, modules, applications, etc. Further, although illustrated as a single application (607), the application (607) may be implemented as multiple applications (607) on the computer (110). In addition, although illustrated as integral to the computer (110), in alternative implementations, the application (607) can be external to the computer (110).

There may be any number of computers (110) associated with, or external to, a computer system containing computer (110), each computer (110) communicating over network (630). Further, the term "client," "user," and other appropriate terminology may be used interchangeably as appropriate without departing from the scope of this disclosure. Moreover, this disclosure contemplates that many users may use one computer (110), or that one user may use multiple computers (110).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising: obtaining, using a production tree coupled to a computer system having a computer processor, reservoir data and a plurality of downtime factors for a well extending from a surface location to a reservoir and capped at the surface location by the production tree; determining, using the computer processor, an absolute potential flow rate for the well using the reservoir data, wherein the absolute potential flow rate corresponds to an amount of hydrocarbons the well could produce without well constraints; uniformly reducing, using the computer processor, an initial productivity index of the well from the absolute potential flow rate to an abandon well flow rate to create a plurality of reduced productivity indexes comprising a plurality of productivity index multipliers, wherein the initial productivity index is a measurement of an ability of the well to produce hydrocarbons at a predetermined rate; determining a plurality of downtime factor percentages for the well, wherein each downtime factor percentage among the plurality of downtime factor percentages represents a ratio of a variable well production rate at different downtime factors to the absolute potential flow rate; determining, using the computer processor, a relationship between the plurality of productivity index multipliers and the plurality of downtime factor percentages for the well, wherein the relationship represents a plurality of potential production losses for the well; predicting, by the computer processor and using the relationship, production losses of a field of wells as a result of the plurality of downtime factors; determining, by the computer processor, an optimum downtime factor for the well using the relationship between the plurality of productivity index multipliers and the plurality of downtime factor percentages; transmitting, using a command console, the optimum downtime factor to the computer system coupled to the well; and performing, using the production tree and the computer system communicably coupled to the well, a shut-in well maintenance of the well based on the optimum downtime factor.

2. The method of claim 1, wherein uniformly reducing, by the computer processor, the initial productivity index for the well further comprises running several reduction simulations of the initial productivity index.

3. The method of claim 2, wherein the relationship between the plurality of productivity index multipliers and the plurality of downtime factor percentages for the well represents the plurality of potential production losses.

4. The method of claim 3, wherein the plurality of downtime factors are one or more factors selected from a list comprising: shut-in well maintenance, well surveillance, and operational performance.

5. The method of claim 1, further comprising: determining production rate over time for a field, having a plurality of wells, using the optimum downtime factor for each well.

6. The method of claim 1, wherein the relationship between the plurality of productivity index multipliers and the plurality of downtime factor percentages for the well depends on a dynamic simulation model.

7. The method of claim 6, wherein the relationship between the plurality of productivity index multipliers and the plurality of downtime factor percentages for the well is a non-linear relationship.

8. The method of claim 7, wherein the relationship between the plurality of productivity index multipliers and the plurality of downtime factor percentages for the well is an exponential relationship.

9. The method of claim 1, wherein the initial productivity index is equal to the absolute potential flow rate for the well.

* * * * *